United States Patent
Papadopoulos et al.

(10) Patent No.: US 6,978,156 B1
(45) Date of Patent: Dec. 20, 2005

(54) MOBILE RADIO TELEPHONE SYSTEM HAVING AN IDENTITY WHICH CAN BE DYNAMICALLY CHANGED

(75) Inventors: Nikolaos Papadopoulos, Muchen (DE); Klaus Vedder, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/485,679

(22) PCT Filed: Mar. 6, 1999

(86) PCT No.: PCT/EP99/03107

§ 371 (c)(1),
(2), (4) Date: Jun. 19, 2000

(87) PCT Pub. No.: WO00/01179

PCT Pub. Date: Jan. 6, 2000

(30) Foreign Application Priority Data

Jun. 29, 1998 (DE) .................................. 198 28 735

(51) Int. Cl.$^7$ .................................................... H04M 1/00
(52) U.S. Cl. ..................... 455/558; 455/418; 455/406
(58) Field of Search ............................. 455/558, 438, 455/433, 406, 410, 557, 407, 408, 432.3, 455/552.1, 551, 432.1; 380/228, 233, 247; 379/357.01, 357.02

(56) References Cited

U.S. PATENT DOCUMENTS

| 5,854,976 | A | * | 12/1998 | Garcia Aguilera et al. . 455/411 |
| 5,956,633 | A | * | 9/1999 | Janhila ......................... 455/410 |
| 5,956,653 | A | * | 9/1999 | Lahti ........................... 455/406 |
| 6,198,823 | B1 | * | 3/2001 | Mills ........................... 380/247 |
| 6,212,372 | B1 | * | 4/2001 | Julin ........................... 340/5.2 |
| 6,285,869 | B1 | * | 9/2001 | Shannon et al. ............. 455/411 |
| 6,321,079 | B1 | * | 11/2001 | Cooper ........................ 455/411 |
| 6,324,402 | B1 | * | 11/2001 | Waugh et al. .............. 455/403 |

* cited by examiner

Primary Examiner—Temica Beamer
Assistant Examiner—S. Smith
(74) Attorney, Agent, or Firm—Bacon & Thomas, PLLC

(57) ABSTRACT

The invention relates to a mobile radio system having a plurality of mobile terminals (ME) connected with a mobile switching center (MZ) via an air interface for communication control and optionally for billing. The mobile terminals (ME) are controlled by a subscriber identity module (SIM) in which data for associating at least one user are stored, the subscriber identity module (SIM) having an identity (IMSI) associated therewith. For utilizing a mobile radio device for different purposes, such as private and business, a subscriber identity module is known which contains at least two permanently stored identities and thus has the disadvantage of being inflexible. The invention therefore proposes a subscriber identity module (SIM) containing a calculation rule for calculating from the stored identity (IMSI) at least one further identity ($IMSI_w$), the identities generated by the calculation rule being associated accordingly in the mobile switching center (MZ).

15 Claims, 3 Drawing Sheets

MOBILE RADIO TELEPHONE SYSTEM HAVING AN IDENTITY WHICH CAN BE DYNAMICALLY CHANGED

This application claims priority to the following applications (the entirety of all of which are incorporated herein by reference: PCT/EP99/03107 filed May 6, 1999.

BACKGROUND OF THE INVENTION

This invention relates to a mobile radio system having a plurality of mobile terminals connected with a mobile switching center via an air interface for communication control and optionally for billing. In addition the invention relates to a method for operating mobile terminals of a mobile radio system.

In known mobile radio systems, for example the GSM network, the mobile terminals are usually connected with a mobile switching center via an air interface. The mobile terminals are controlled by a subscriber identity module. This subscriber identity module is usually designed in the form of a chip card in ID-1 or ID-000 format disposed removably in the mobile terminal. The subscriber identity module (SIM) is used inter alia for granting the authorized person access to the mobile radio network and permitting call accounting. For this purpose the SIM contains a subscriber identity (International Mobile Subscriber Identity IMSI) for identifying the subscriber world-wide in all GSM networks. The subscriber identity usually has the billing account assigned thereto through which call accounting is done.

In particular for double utilization of a mobile phone (e.g. for business and private purposes) it has proven advantageous to equip the subscriber identity module with at least one further identity. European patent specification EP 0 579 655 B1 discloses a method for mobile telephone systems controlled by subscriber identity modules each containing at least two alternatively usable identities. When beginning to operate the mobile unit the user can activate the desired identity through the insert direction of the subscriber identity module or by entering a personal identification number (PIN) via the keyboard.

The disadvantage of the known method is that the alternatively usable identities must already be stored in the card upon its issue. That means in practice that the number of alternatively usable identities must already be known when a mobile radio connection is applied for. In particular when a new identity is to be allotted later this can only be done by issuing a new card, i.e. a new subscriber identity module.

The problem of the invention is therefore to state a mobile radio system and a method for operating the mobile radio system and a subscriber identity module which avoid the abovementioned disadvantages.

SUMMARY OF THE INVENTION

A mobile radio system is provided wherein the subscriber identity module used for controlling the mobile terminals contains a calculation rule for calculating at least one further identity from the stored identity. Identities generated in accordance with the calculation rule are associated accordingly in the mobile switching center. An alternative for solving the abovementioned problem is to design the subscriber identify module so as to permit generation of a request signal which is transmitted to the mobile switching center and processed there, whereupon an alternative identity is communicated to the subscriber identity module via the air interface.

The advantage of the present invention is that one need not store all identities on the chip card, i.e., the subscriber identity module. This makes the system more flexible to handle since the additional identities can be assigned after the card is issued to the user, i.e. after he has applied for the connection. It is thus possible for the owner of a mobile phone having an associated identity to obtain a second identity at a later time without a new card having to be issued.

According to an advantageous development of the invention, the calculation request for a new identity is triggered by the user by a keyboard entry or via the menu. In the simplest case one can provide in the mobile phone a changeover switch having two or more switching positions each triggering an associated calculation process. Alternative menu-driven triggering has the advantage that the menu display can be controlled by the subscriber identity module so that no changes need be made in the mobile terminal. This advantage also applies to a further advantageous development of the invention by which the calculation or request for a new identity is initialized by entry of a PIN. In this case a plurality of personal identification numbers with which the user identifies himself as authorized are stored in the subscriber identity module. Entry of a PIN then triggers not only the function enable but also the calculation of the desired subscriber identity if the latter does not correspond to the original identity.

Since the mobile terminals of a mobile radio system are frequently operated in outside networks, it has proven advantageous to calculate a further directory entry (phone number) and/or a further authentication key together with the further identity. In particular the further directory entry has the advantage that the mobile terminal can only be reached with the corresponding phone number in the directory entry. This permits the user to ensure for example that he only gets private calls during a private stay in the territory of an outside network. The different phone numbers for dialing the user also permit the costs assigned to the user that arise in the outside network to be assigned upon forwarding of a "business" call, i.e. a call to the phone number not currently selected.

The invention further relates to a method for operating mobile terminals which generates from a single identity stored in the subscriber identity module the further identities by a calculation rule if required. The method offers the advantage stated above for the mobile radio system according to the invention that one need not store a plurality of identities in a card, but the system can work more flexibly since the card can be issued without having to store all identities that might possibly be used.

According to the invention the calculation of the new identity can be performed either in the subscriber identity module or in the mobile switching center, in which latter case the mobile terminal sends a request to the mobile switching center and the new identity is communicated to the mobile terminal and thus to the subscriber identity module via the air interface of the mobile radio system.

The inventive method provides for the further advantageous development that the current identity is newly calculated for each identity for a check, which is performed at the request of the mobile switching center or the mobile terminal. In this way one need not provide any memory space for storing further identities in the subscriber identity module.

Should the current identity have to be available more quickly, for example due to the calculation time necessary for calculation, it is also possible to store the currently set identity temporarily in the subscriber identity module.

The invention further proposes a subscriber identity module for a mobile terminal in a mobile radio system which is suitable for use by the abovementioned method. For this purpose a calculation rule is stored in the subscriber identity module for calculating at least one further identity from the stored identity. Alternatively, the subscriber identity module can be designed to generate a request signal. In this case the subscriber identity module initializes calculation of the new identity in the network center, so that calculation of the alternative or further identity is not generated in the card, i.e. in the subscriber identity module.

BRIEF DESCRIPTION OF THE DRAWINGS

Preferred embodiments of the invention will be explained more closely in the following with reference to FIGS. 1 to 5, in which.

DETAILED DESCRIPTION OF THE INVENTION

Figure 1:
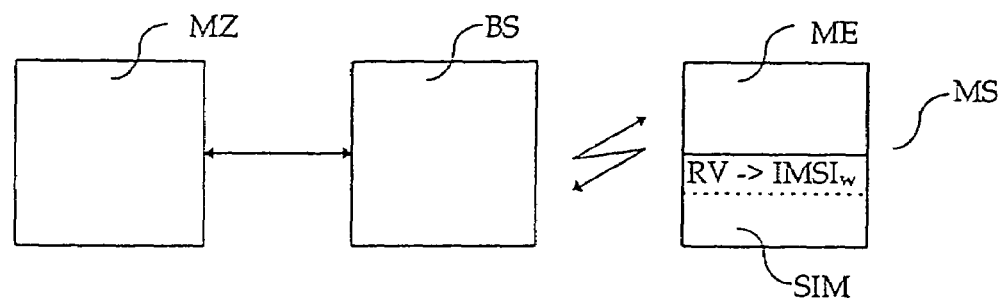
FIG. 1 shows the basic structure of a mobile radio network.

FIG. 1 shows a mobile radio system consisting of mobile switching center MZ, base station system BS and mobile station MS consisting of mobile terminal ME and subscriber identity module SIM. Subscriber identity module SIM is a chip card specific to mobile radio and yielding in conjunction with mobile terminal ME operable mobile station MS. Stored in the subscriber identity module are all data necessary for granting network access only to authorized persons and for performing call accounting. The essential tasks of the subscriber identity module are authentication vis-à-vis the mobile radio system and storage of user-specific data. In particular data concerning the identity of the subscriber IMSI are stored in the subscriber identity module. Data and speech are exchanged between mobile unit ME and base station BS by radio transmission. Base stations BS are connected with mobile switching center MZ. Mobile switching center MZ contains a visitor location register and a home location register in which user data are stored temporarily (in the visitor location register) or permanently (in the home location register). Important data are in particular the subscribers' IMSI and the directory entries MSISDN associated with the IMSI. According to the invention, subscriber identity module SIM contains one or more calculation rules RV for calculating from identity IMSI permanently stored there at least one further identity $IMSI_w$. In the mobile switching center the further identities associated with an original IMSI are stored or generated by the same calculation rule as in the subscriber identity module.

Figure 2:
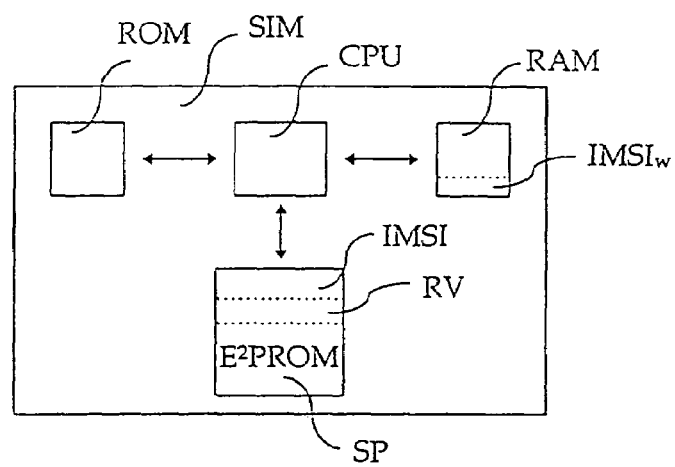
FIG. 2 shows the block diagram of a subscriber identity module.

FIG. 2 shows a rough block diagram of subscriber identity module SIM. This SIM contains arithmetic unit CPU connected with program memory ROM, working memory RAM and nonvolatile memory SP, preferably an $E^2PROM$. Stored in nonvolatile memory SP are original identity IMSI and calculating rule RV for calculating particular new identity $IMSI_w$ at the request of the user or at the request of the mobile terminal or the mobile switching center. Calculating rule RV can also be stored alternatively in the ROM. The $IMSI_w$ newly calculated by given calculating rule RV can also be stored temporarily in working memory RAM so that it is immediately available at the request of the mobile radio system.

Figure 3:
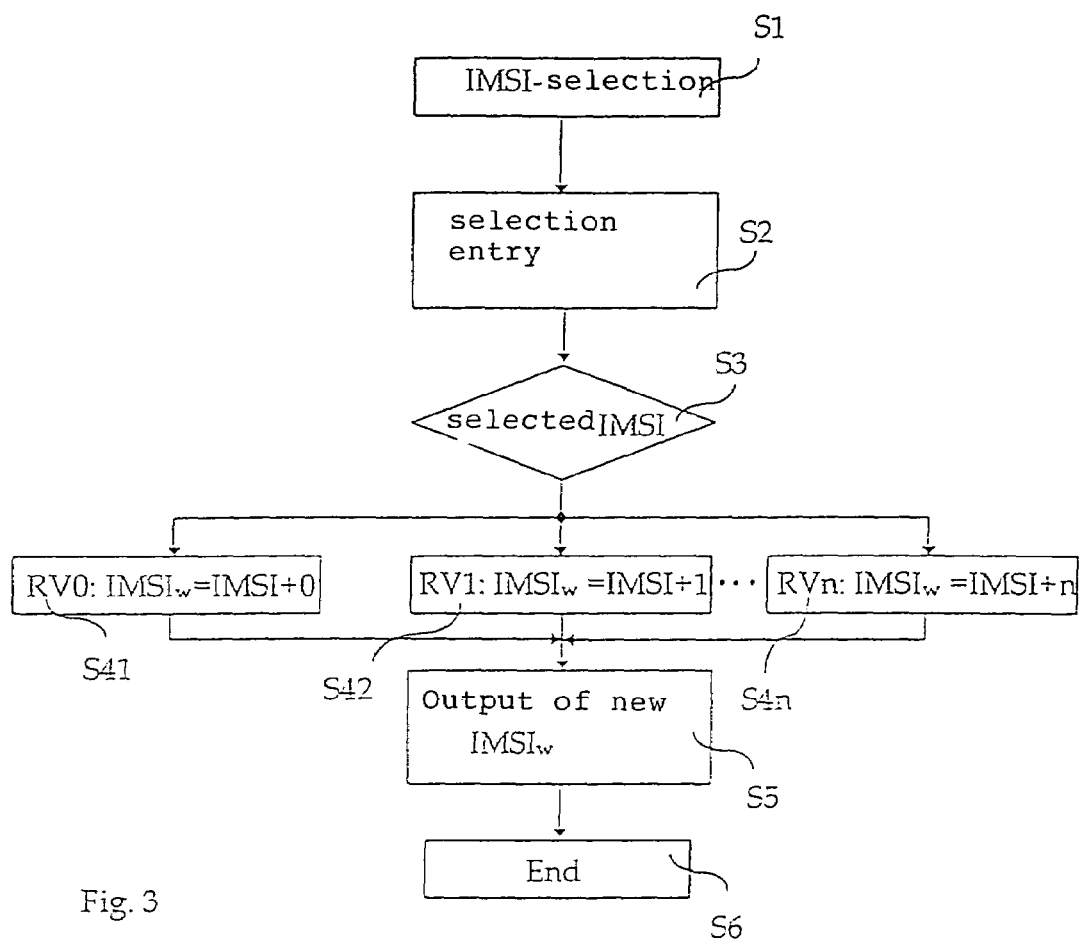
FIG. 3 shows a first flow chart of the dynamic IMSI selection.

FIG. 3 shows an example of the flow chart for selecting a further identity. In the figure the program start for IMSI selection is designated S1. The selection request is started either at the request of the user by a menu selection or at the request of the network or the mobile unit. In program step S2 the user is asked for an entry or a previous entry is accepted. In step S3 the selection entry from step S2 is checked, and the corresponding calculating rule is executed according to step S41, S42, . . . S4n. If the selected IMSI is the original IMSI no change is made or the value "0" is added to the original IMSI. If identity 1 is selected a calculation is done by calculating rule RV1 and the value "1" is added to the original IMSI. The same applies to all further possible identities up to IMSIn in step S4n.

The newly calculated $IMSL_w$ is then outputted in step S5. The $IMSI_w$ outputted for authentication or a check is newly calculated at each request of the mobile unit to subscriber identity module SIM, in which case the last entered value is accepted instead of the selection entry (S2). Step 2 can be omitted in this case, or consists in an instruction to load the last entered selection entry value from a memory.

Alternatively, the new $IMSI_w$ calculated in step S4 (S41–S4n) can be stored by the user temporarily in the RAM or $E^2PROM$ of subscriber identity module SIM until the mobile unit is turned off or a new IMSI selected.

Figure 4:
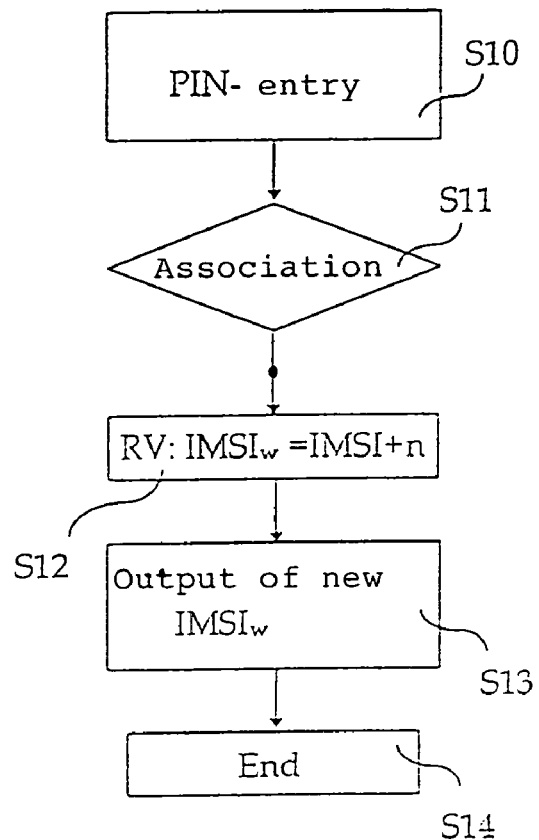
FIG. 4 shows a second flow chart of the dynamic IMSI selection.

FIG. 4 shows by way of example a flow chart for the procedure of IMSI selection by entry of a PIN. In step S110 the selection program is started by entry of a new PIN. In step S11 an association for the calculating rule in S12 is generated in accordance with the selected PIN. This association defines which calculation rule is selected (not shown in the figure) or which identity value is added to original identity IMSI by means of a single calculating rule RV (step S12).

After execution of calculation rule S12, which consists in the simplest case of the addition of an identity value to the original IMSI, the new identity is outputted as described above for FIG. 3, step S5.

In the case of IMSI selection by means of a switch optionally having a plurality of switch positions, step S10 can be omitted since a new association can be determined directly from the switch position, for example, or the switch position directly indicates this association.

The procedures shown in FIGS. 3 and 4 presuppose of course that for checking entitlement to network access the IMSIs obtainable by the calculation rules, i.e. the possible IMSIs, are either stored in the mobile switching center or can be calculated there as in the subscriber identity module, in which case the permissible identity values must be stored.

In the case of a new identity which was not approved when subscriber identity module SIM was issued, the new identity values required for calculating the new identity from the original IMSI can be inputted either directly by means of a terminal or using the OTA (over-the-air) function via the air interface.

Figure 5:
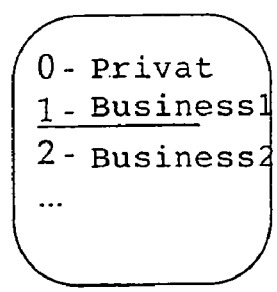
FIG. 5 shows an exemplary menu display.

FIG. 5 shows by way of example a menu displaying the possible identities with the corresponding identity values. The currently selected identity is indicated in the menu by emphasis, e.g. underlining. A new identity can be selected for example by means of "forward keys" usually disposed in a mobile radio device and an "OK" function.

What is claimed is:

1. A mobile radio system having a plurality of mobile terminals (ME) connected with a mobile switching center (MZ) via an air interface for communication control and optionally for billing, the mobile terminals (ME) being controlled by a subscriber identity module (SIM) in which data for associating at least one user are stored, the subscriber identity module (SIM) having an initial international mobile subscriber identity (IMSI) associated therewith, wherein the subscriber identity module (SIM) contains a calculation rule for calculating and generating from the stored identity (IMSI) at least one new, additional international mobile subscriber identity ($IMSI_w$), the at least one new identity created by the calculation rule being associated accordingly in the mobile switching center (MZ).

2. A mobile radio system according to claim 1, characterized in that the calculation or request for a new, additional identity ($IMSI_w$) is effected by a user entry via keyboard or menu.

3. A mobile radio system according to claim 1, characterized in that the calculation or request for a new, additional identity ($IMSI_w$) is initialized by entry of a PIN.

4. A mobile radio system according to claim 1, characterized in that a further directory entry and/or a further key are calculated together with the new, additional identity ($IMSI_w$).

5. A method according to claim 4, characterized in that an identity is set by entry of a personal identification number (PIN) via menu and/or keyboard.

6. A mobile radio system having a plurality of mobile terminals (ME) connected with a mobile switching center (MZ) via an air interface for communication control and optionally for billing, the mobile terminals (ME) being controlled by a subscriber identity module (SIM) in which data for associating at least one user are stored, the subscriber identity module (SIM) having an international mobile subscriber identity (IMSI) associated therewith, wherein the subscriber identity module (SIM) is configured to generate a request signal and in response to the request signal the mobile switching center (MZ) communicates a new additional international mobile subscriber identity ($IMSI_w$) associated with the subscriber identity module (SIM).

7. A method for operating mobile terminals (ME) of a mobile radio system which are controlled by a subscriber identity module suitable for operation with an initial international mobile subscriber identity (IMSI) and at least international mobile subscriber identity ($IMSI_w$), wherein the at least one additional identity ($IMSI_w$) is created by a calculation rule from the initial identity (IMSI) stored in the subscriber identity module (SIM).

8. A method according to claim 7, characterized in that the calculation is executed in the subscriber identity module (SIM).

9. A method according to claim 7, characterized in that the calculation is performed in the mobile switching center (MZ) at the request of the mobile terminal (ME), and the new identity is communicated to the mobile terminal (ME) via the air interface of the mobile radio system.

10. A method according to claim 7, characterized in that a further directory entry and/or a further key are calculated together with the new additional identity ($IMSI_w$).

11. A method according to claim 7, characterized in that the new additional identity ($IMSI_w$) is newly calculated at each check or request by the mobile switching center (MZ) or the mobile terminal (ME).

12. A method according to claim 7, characterized in that the new additional identity ($IMSI_w$) is stored temporarily in the subscriber identity module (SIM) until a new initial identity (IMSI) is selected or the mobile terminal (ME) is turned off.

13. A subscriber identity module (SIM) for a mobile terminal (ME) in a mobile radio system in which an initial international mobile subscriber identity (IMSI) for a user is stored, wherein a calculation rule is stored in the subscriber identity module (SIM) for calculating from the initial identity (IMSI) at least one new additional international mobile subscriber identity ($IMSI_w$).

14. A subscriber identity module (SIM) according to claim 13, characterized in that the subscriber identity module contains a temporary memory area (RAM) for temporarily storing a new additional identity ($IMSI_w$) which is calculated or communicated by the mobile switching center (MZ).

15. A subscriber identity module according to claim 13, characterized in that a memory address pointer is provided for pointing to a selected temporary memory location where the current selected identity (IMSI, $IMSI_w$) is stored.

* * * * *